United States Patent [19]

Schmitt

[11] 4,068,766
[45] Jan. 17, 1978

[54] METHOD AND APPARATUS FOR STACKING AND BLENDING BRICKS OR THE LIKE

[75] Inventor: Marvin Glenn Schmitt, Fountain Valley, Calif.

[73] Assignee: AMI Industries, Inc., Downey, Calif.

[21] Appl. No.: 707,183

[22] Filed: July 21, 1976

[51] Int. Cl.² .............................................. B65G 57/26
[52] U.S. Cl. .................................... 214/6 A; 198/420; 214/6 H; 214/152
[58] Field of Search ............. 214/6 A, 6 H, 8, 10.5 R, 214/152; 198/420, 421

[56] References Cited

U.S. PATENT DOCUMENTS

| 2,672,992 | 3/1954 | Whissen .......................... 214/10.5 R |
| 3,090,502 | 5/1963 | Gunzelmann ...................... 214/6 A |
| 3,095,678 | 7/1963 | Cliff et al. ........................ 214/6 A X |
| 3,538,993 | 11/1970 | Potter et al. ..................... 198/420 X |
| 3,656,634 | 4/1972 | Pearne et al. ......................... 214/6 A |

Primary Examiner—L. J. Paperner
Attorney, Agent, or Firm—McNenny, Pearne, Gordon, Gail, Dickinson & Schiller

[57] ABSTRACT

A stacker blender for bricks is disclosed in which a plurality of pallets move progressively down an inclined conveyor and are progressively positioned in a series of course receiving positions. The angle of inclination of the conveyor is arranged so that, after indexing, the uppermost course of a stack on each pallet is positioned at a predetermined horizontally aligned level to receive a subsequent course. A gripper transfer simultaneously grips a plurality of courses from a supply conveyor and transfers a course to each stack at each stacking location. Because each partial stack has one more course than the preceding partial stack the courses transferred during a given transfer operation appear at different levels in the different stacks. This assures complete blending. A void course is transferred at a predetermined location during each cycle so a simplified void course forming system is utilized. With a stacker blender a completed stack is produced during each machine cycle and is subsequently transferred by a shuttle transfer and a roller conveyor system to a strapper. Stabilizing means are provided to grip the partially formed stacks as they are formed and as they are indexed along the incline conveyor from one position to the next. A damping or shock absorbing system is provided for the transfer which allows the use of a simple automotive type shock absorber to provide a damping gradient which insures a smooth deceleration of the transfer as it approaches the end positions of its travel.

36 Claims, 11 Drawing Figures

METHOD AND APPARATUS FOR STACKING AND BLENDING BRICKS OR THE LIKE

BACKGROUND OF THE INVENTION

This invention relates generally to stack forming systems for rectangular shaped articles such as brick or the like and more particularly to a novel and improved method of stacking and blending such articles and to a novel and improved machine for performing such method.

PRIOR ART

Machines are known for forming stacks of brick or the like which are strapped to produce packages suitable for efficient handling and storage. Such packages are usually provided with void courses to permit handling with fork lift trucks or the like.

The U.S. Pat. Nos. 3,392,851 dated July 16, 1968; 3,491,901, dated Jan. 27, 1970; 3,656,634 dated Apr. 18, 1972; and 3,917,081 dated Nov. 4, 1975, all assigned to the assignee of the present invention, describe stackers for producing stacks which are subsequently strapped into such packages. These patents all describe systems in which one or more stacks are built on an elevator which is sequentially lowered as courses are positioned thereon. During each stacking cycle a course is positioned on the elevator and the elevator is then lowered to receive a subsequent course. When the stack is completed, it is moved off of the elevator for strapping and the elevator is again raised to permit the building of a subsequent stack or stacks. In the latter two of these patents, systems are disclosed in which the output capacity is greatly increased by arranging the stacker so that relatively large numbers of stacks are simultaneously formed.

In such stackers and in other prior art stacking systems, color gradient problems exist if means are not provided to blend the brick before they reach the stacker. Such blending is important since brick are usually fired in hacks arranged on kiln cars or the like. In such hacks the firing of the individual brick is not completely uniform and bricks in one zone of the hack tend to have one color or hue and bricks in other zones of the hack have different colors or hues. If bricks are stacked in substantially the same arrangement they exist in the hack, there is a tendency for marked color gradients to exist when the bricks are laid up. Therefore the dehacking systems are sometimes arranged to blend the brick before stacking to eliminate such marked color gradient. The U.S. Pat. Nos. 3,601,266 dated Aug. 24, 1971 and 3,669,283 dated June 13, 1972 describe unloaders or dehackers which also provide blending. The former of these two patents is also assigned to the assignee of the present invention.

SUMMARY OF THE INVENTION

In accordance with the present invention a novel and improved method and apparatus is provided for blending and stacking within a single system. In accordance with the illustrated embodiment, spaced rows or courses are delivered to the stacker by a conveyor located parallel to the stacker. The stacker provides a plurality of stacking pallets which are sequentially moved down an inclining conveyor to a plurality of course receiving positions. The structure is arranged so that the pallets are lowered a distance substantially equal to one course height as they move from one course receiving location to the next so that the uppermost course previously positioned on each pallet is horizontally aligned with the uppermost course on the other pallets.

A gripper transfer operates to simultaneously grip a plurality of courses on the supply conveyor and to simultaneously position a course on each pallet at each course receiving location so that the stacks are progressively formed with one stack being completed during each machine cycle.

There are a number of important benefits derived from the method and apparatus of this invention. This invention permits the simultaneous forming of a large number of stacks, therefore high output is achieved without operating the system at high cyclic speeds. Very good blending is also obtained since the courses deposited on each stack during each machine cycle appear at different course levels in each stack.

Further, a simplified stacking system is provided in which one complete stack is produced during each machine cycle. With such system a more uniform flow is provided to the strapper.

In accordance with still another aspect of this invention, a void course is produced and transferred to the stack at the same location during each cycle of operation. This substantially simplifies the structural arrangement since a single void forming and transfer mechanism may be provided even though a large number of stacks are being simultaneously formed. Further, a simplified horizontally movable transfer is supplied from a simple horizontal conveyor. Still further a simple descending conveyor replaces the elevator system of many prior art stacker systems.

These and other aspects of this invention are illustrated in the drawings and are described more fully in the following description.

DETAILED DESCRIPTION OF THE DRAWINGS

Figure 1:
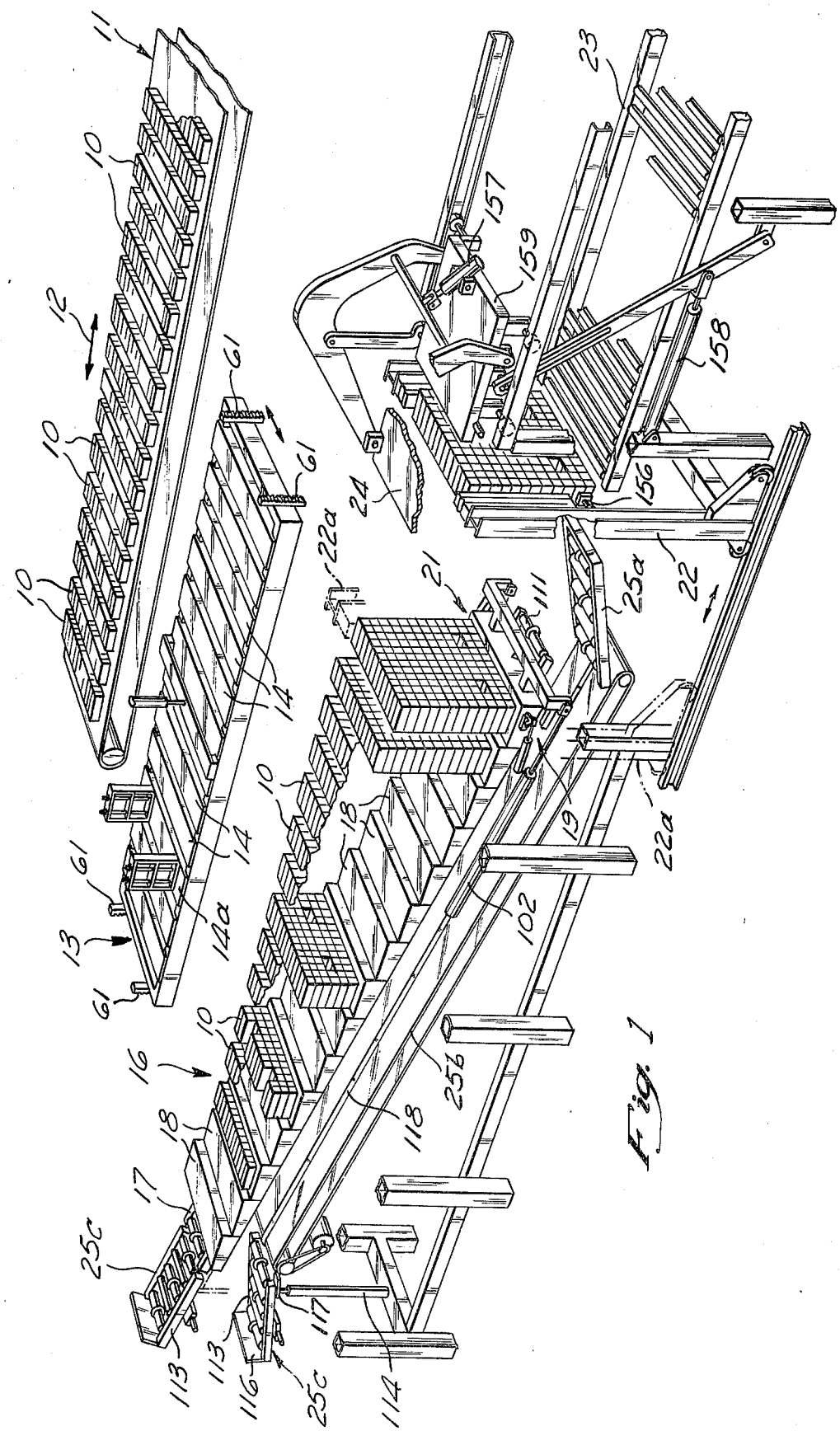
FIG. 1 is a schematic perspective view of a blender stacker in accordance with this invention with parts removed or broken away to better illustrate the functional operation of the various subsystems.
Figure 2:
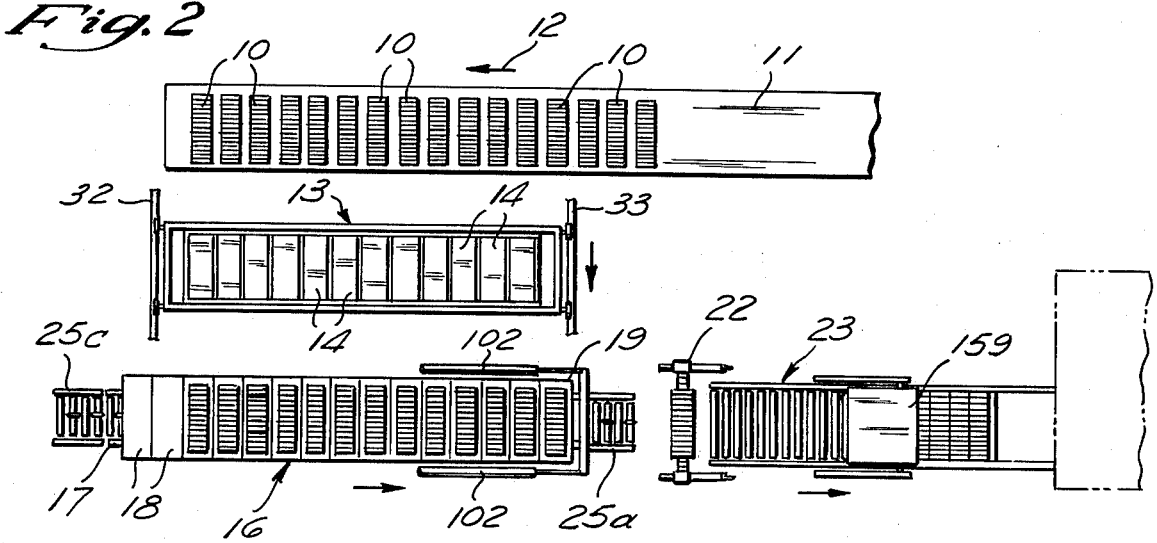
FIG. 2 is a schematic plan view of the blender stacker system of FIG. 1.
Figure 3:
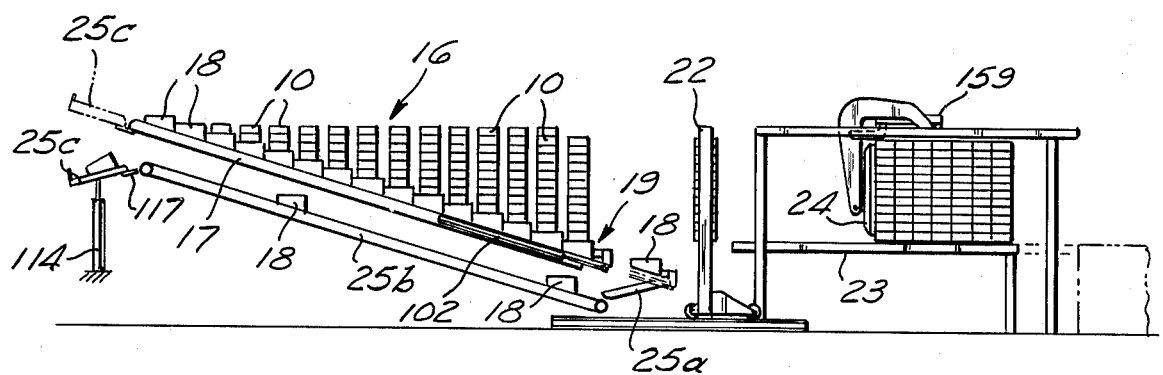
FIG. 3 is a schematic side elevation of the blender stacker system of FIGS. 1 and 2.

FIG. 1 schematically illustrates the overall system incorporating a preferred embodiment of the present invention. In such system courses 10 of spaced brick are delivered by a horizontal conveyor 11 which operated to carry the courses 10 in the direction of the arrow 12 to the gripping position illustrated. In the illustrated system twelve stacks are simultaneously formed so the conveyor 11 is arranged to deliver twelve courses 10 to a gripping location in which they are subsequently transferred to the stacks in the manner described below. In the illustrated embodiment each course includes thirteen individual laterally abutting brick.

A gripper transfer 13 is provided with twelve course grippers 14 each of which operates to grip a single course 10 resting on the conveyor 11 and to support such courses as the gripper frame is moved from the pick up location over the conveyor 11 and to a delivery position over the descending stacker blender 16. The stacker blender includes an inclined roller conveyor 17 along which a plurality of separate stacking pallets 18 move. A stack is built on each pallet as it moves down along the conveyor.

A pallet control system 19 is provided at the lower end of the roller conveyor 17 to cause progressive positioning of the pallets 18 in each of the twelve stacking locations. A course 10 is positioned on each of the pallets at each stacking location to progressively build a stack of twelve courses. The pallet conveyor 17 is inclined so that as each pallet 18 moves from one stacking location to the next, the pallet is lowered a distance equal to the height of one course. Consequently, the uppermost course on each pallet as each pallet moves from one stacking location to the next is level with the uppermost course on the other pallets.

The control system also is arranged to move a fully loaded pallet to a delivery position 21 where it is gripped by a shuttle or transfer assembly 22 and is horizontally moved from the stacking pallet to a roller conveyor 23. When a stack is positioned on the roller conveyor 23 by the transfer carriage 22 a pusher plate 24 lowers behind the stack and is operated to push the stack along the roller conveyor 23 to the strapper (not illustrated).

After the stack is removed from the pallet at the delivery location 21 the pallet control system operates to allow further movement of the pallet off of the end of the roller conveyor 17 where it drops onto a pallet return system including a transfer conveyor 25a which is inclined to cause the pallet to roll downwardly onto a powered inclined conveyor 25b. The conveyor 25b in turn carries the empty pallets along an incline beneath the main roller conveyor 17 to a transfer mechanism 25c which operates to return the empty pallet to the upper end of the roller conveyor 17. In such system pallets are sequentially delivered to the upper end of the roller conveyor 17 and move by gravity down along the roller conveyor in a manner controlled by the pallet control system 19.

As each pallet is progressively positioned in a course receiving location (12 locations in the illustrated embodiment) an individual course is delivered by the gripper transfer 13 and positioned on the pallets or on the course previously positioned on the pallet. When each pallet reaches the twelfth course receiving position a full stack is completed on the pallet and during subsequent operation the pallet moves to the delivery position 21 wherein the stack is removed and the pallet is again returned to the upper end of the roller conveyor 17 to receive a subsequent stack.

In the illustrated system a full stack of 12 courses is formed during each cycle of the machine so a steady flow is provided from the stacker blender to the strapper which subsequently stacks together in the required package of brick.

Figure 4:
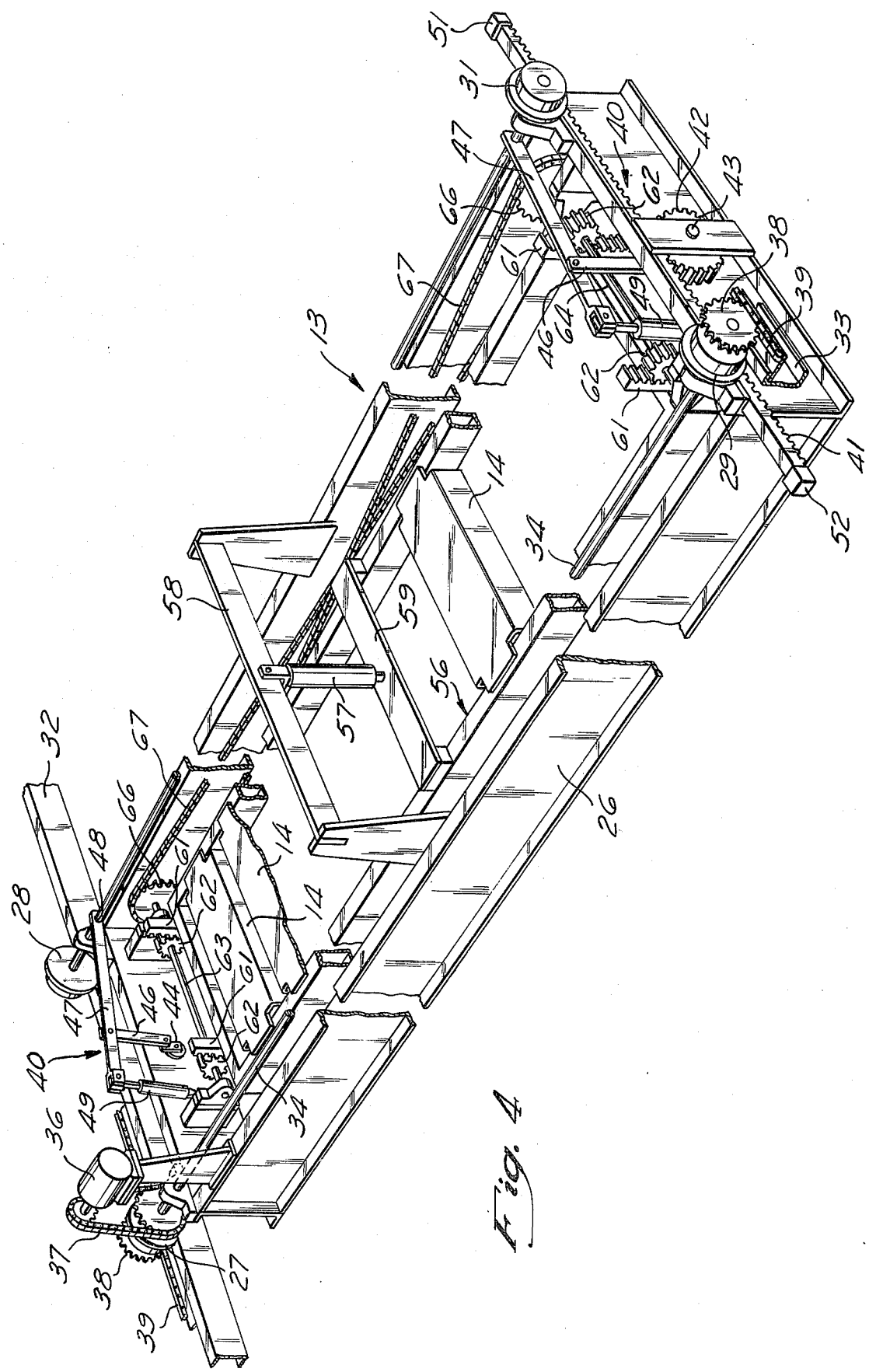
FIG. 4 is a cutaway perspective view of the transfer and gripper frame assembly with parts broken away or removed to facilitate the illustration of the structure.

The structural details of the transfer gripper 13 are best illustrated in FIGS. 4 through 7. Referring to FIG. 4 the transfer gripper includes a main frame 26 of rectangular shape. The frame is provided with four support rollers 27, 28, 29 and 31 with one journaled at each corner thereof. The two rollers 27 and 28 engage and roll along a track member 32 at one end of the frame and the other two rollers 29 and 31 engage and roll along a track member 33 at the other end of the frame. The track 32 and 33 extend perpendicular to the conveyor 11 and the descending conveyor 17 and are arranged so that the frame 26 can roll back and forth between the positions over the two conveyors. The two rollers 27 and 29 are mounted on a shaft 34 which is powered by a motor 36 through a chain drive 37. Mounted on the shaft 34 adjacent to each of the rollers 27 and 29 is a sprocket wheel 38 which engages an associated chain 39 mounted on the associated of the rails 32 or 33. This structure provides a positive mechanical drive so that as the motor rotates in one direction or the other the two ends of the frame are moved a uniform distance along the rail. In effect the sprocket wheel and chain provide a rack and pinion type mechanical drive.

A shock absorber system 40 is provided at each end of the frame to decelerate or slow the frame 26 in a controlled manner as it approaches the ends of its travel along the two tracks 32 and 33. A similar system 40 is provided at each end of the frame 26, however a part of the system at the far end of the frame, as illustrated in FIG. 4, is eliminated for purposes of improving the clarity of the drawing.

The systems 40 each includes an elongated rack 41 mounted on the frame for lengthwise movement and engaging a pinion gear 42 journaled on the frame 26. Consequently, the gear 42 is rotated when the rack 41 is moved axially with respect to the frame 26. The gear 42 is mounted on a shaft 43 having a crank 44 at its opposite end as illustrated at the far end of the frame in FIG. 4. Pivotally connected to the crank 44 is a link 46 which is pivoted at its other end to a pivoted beam 47. The beam 47 is anchored for pivotal movement at 48 so that as the crank rotates in response to rotation of its associated gear 42 the beam 47 moves up and down. Mounted on the free end of the beam 47 is one end of a shock absorber 49 which is connected to the frame so that it resists vertical movement of such free end of the beam.

The structure is arranged so that the crank 44 is aligned with the link 46 when the rack is in a neutral position. As the frame 26 moves along the two tracks 32 and 33 and approaches the end of its travel, for example over the conveyor 11 one end 51 of each of the two racks at the two ends of the frame engages a fixed abutment (not illustrated) preventing further movement of each rack 41 with the frame 26. The continued movement of the frame causes anti-clockwise rotation of the associated gears 42. This rotation of the gears results from relative movement between the racks 41 and the frame 26 and in turn causes the cranks 44 to pull the beams down against the action of the associated shock absorbers 49. The two shock absorbers therefore function to resist continued movement of the frame and operate to decelerate the frame.

When the frame is moving in the opposite direction toward the delivery position over the inclined conveyor 17 the other ends 52 of each of the racks engages a fixed abutment (not illustrated) preventing continued movement of the rack with the frame and causing clockwise rotation of the associated gear. Here, again the action of the cranks 44 through the links 46 pulls the ends of the beams 47 down against the action of the shock absorbers 49 to gradually slow the frame as it approaches its end position of travel. Spring means (not illustrated) are provided to center the racks 41 so that the cranks 44 assume a position substantially in alignment with their associated links 44 when the frame is in movement and out of engagement with the rack engaging stops. With this structure the movement of the beams is essentially harmonic with substantial rotation of the pinion gears 42 causing relatively small movement of the beams initially. As the cranks move away from the dead center position the amount of movement of the beams 47 increases with respect to gear rotation. Consequently, the compression of the shock absorbers 49 is small with respect to the frame movement when the racks first engage their abutting stops and increases with respect to frame movement as the cranks move away from their dead center position. Therefore the damping provided for by the shock absorbers is initially small and increases as the frame moves to its final position. With this simple damping structure low cost automotive type shock absorbers can be utilized effectively and provide a damping curve or gradient which provides a smooth deceleration of the frame as it approaches its two end positions.

A gripper frame 56 is supported within the main frame 26 for vertical movement with respect thereto. A piston and cylinder actuator 57 is connected at one end to a bridge structure 58 supported by the main frame 26 and is connected at its other end to a cross member 59 on the gripper frame 56. Preferably the piston cylinder actuator 57 is centrally located with respect to the gripper frame 56 to provide balanced support for the frame 56. When the actuator is extended the frame 56 is lowered with respect to the main frame 26 and when the actuator 57 is retracted the gripper frame is raised with respect to the main frame 26.

A rack and gear system is provided at each corner to insure that the gripper 56 remains level as it is raised and lowered. This mechanism includes four gear racks 61 with one mounted adjacent to each corner of the frame 56. Each rack engages an associated pinion gear 62 journaled on the frame 26. The two pinion gears 62 at one end of the frame are mounted on a shaft 63 for co-rotation and the two pinion gears 62 at the other end of the frame are mounted on another shaft 64 for co-rotation. The two shafts 63 and 64 are interconnected by sprockets 66 and a chain 67 for rotation in opposite direction through equal angles. With this structure the four corners of the gripper frame 57 are maintained at the same height and move up and down equal amounts when the actuator 57 is operated.

Figure 5:
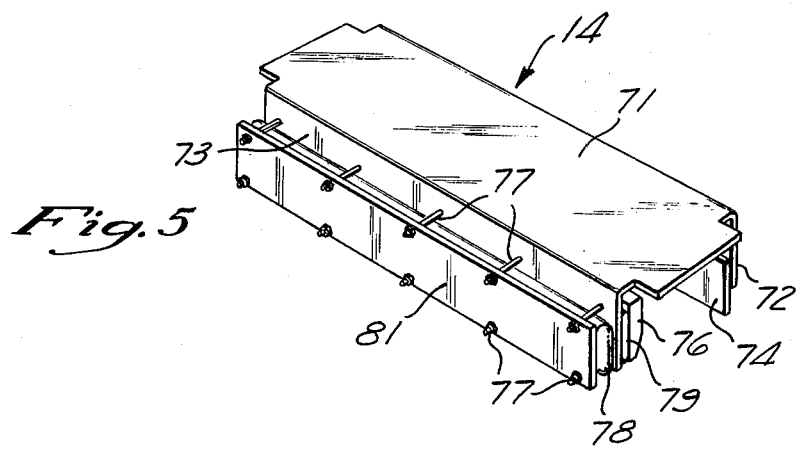
FIG. 5 is a perspective view of one of the course grippers carried by the gripper frame and operable to grip and transfer a full course from the supply conveyor to the descending stacker.

The course grippers 14 are carried by the gripper frame 56 and are supported at their ends on such frame. Eleven of the 12 course grippers 14 have a structure as illustrated in FIG. 5. These course grippers are provided with a U-shaped body 71 providing depending legs 72 and 73. Mounted on the depending leg 72 is a plate 74 which fits against the inner side of the leg 72 and is supported for limited vertical movement with respect to the plate for reasons discussed in greater detail below.

Supported on the opposite leg 73 is a gripper plate 76 supported by bolts 77 for movement toward and away from the depending leg 73. A pair of pneumatic air bags or tubes 78 and 79 are provided to extend and retract the gripper plate 76. The plate 76 is a flexible member to compensate for brick irregularities When the air bag or tube 78 is inflated, while the bag or tube 79 is deflated, the bag 78 causes a plate 81 to move away from the depending leg 73 and through the action of the bolts 77 moves the gripper plate 56 toward a release position substantially against the depending leg 73. Conversely, when the inner bag 79 is inflated while the outer bag is exhausted the action of the bag 79 causes the gripper plate 76 to move away from the depending leg 73 toward the plate 74 to a gripping position.

Each course gripper is proportioned so that when the gripper 76 is retracted the course gripper can be lowered over a course 10 resting on the conveyor 11. In practice the plate 74 extends below the gripper plate 76 due to gravity and is positioned between one course 10 and the next. The conveyor is then operated to move the courses a short distance toward the associated plate to cause the bricks to engage the plate and to eliminate any misalignment between the bricks in a given course. The course gripper is then lowered the remaining distance by the actuator 57 until the gripper plate 76 is in alignment with the opposite side of the previously aligned course. During such subsequent lowering of the course gripper 14 the engagement between the plate 74 and the conveyor causes the plate 74 to raise up with respect to its associated depending leg until it is in alignment with the gripper plate 76. The inner bag 79 is then pressurized to cause the gripper plate to grip the full course of brick so that it may be transported from the conveyor to the stacking location.

The operation of the gripper is as follows. The frame is first positioned over the conveyor 11 by the operation of the motor 36. The actuator 57 is then extended a sufficient distance to position the vertically slidable plate 74 adjacent to the side of the associated course to be gripped. The conveyor 11 is then operated to move the course into engagement with the plate 74 and to eliminate any misalignment between individual bricks within a given course. The actuator 57 is then operated to lower the gripper frame and inturn the grippers to the gripping position in which the inner bag of each course gripper is inflated to cause gripping of the brick. The gripper frame is then raised to lift the brick up off the conveyor and the entire gripper transfer 13 is moved to its release position over the defending stacking conveyor. When the frame is properly positioned over the conveyor 17 the frame is again lowered to position each course on a course previously positioned on the various pallets 18. The inner bags then exhausted and the outer bags 78 are inflated to release the gripper. The actuator 57 is then operated to raise the gripper frame clear of the stacks so that it may return to the conveyor to pick up a subsequent group of stacks.

Figure 6:
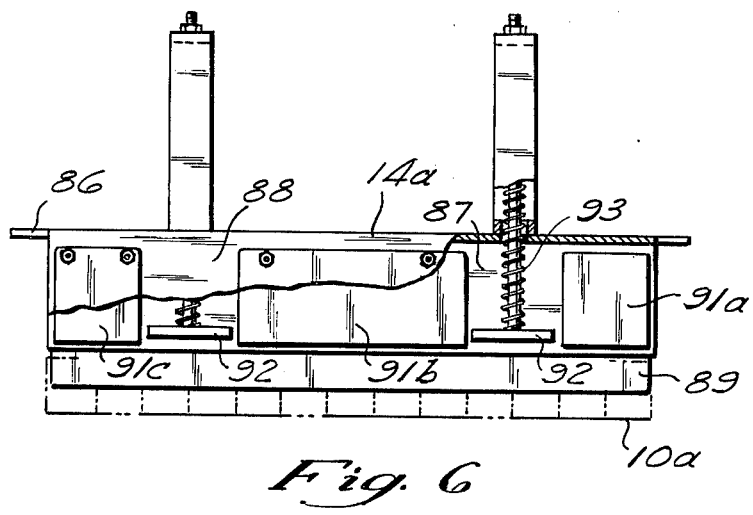
FIG. 6 is a side elevation of the gripper used to form and transfer the void courses.
Figure 7:
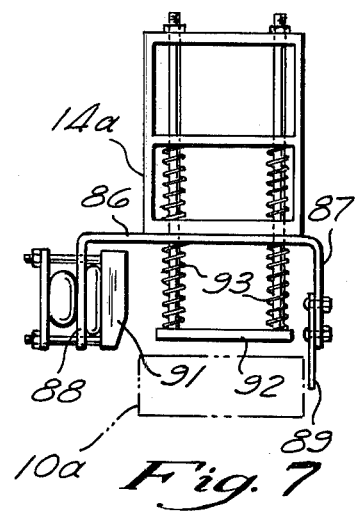
FIG. 7 is an end view of the gripper illustrated in FIG. 6.

FIGS. 6 and 7 illustrate the course gripper 14a which operates to form the void courses. In the illustrated system the void course is formed as the third course from the bottom of each stack so the void course gripper 14a is the third course gripper from one end of the frame. This gripper like the other grippers is provided with a U-shaped body 86 having depending legs 87 and 88. Mounted on the depending leg 87 is a vertically slidable plate 89 which is positioned adjacent to one side of a course 10a as, illustrated in phantom FIGS. 6 and 7, for the alignment process described above. After alignment the void course gripper 14a is lowered with the other grippers by the actuator 57 until its gripper plate 91 is adjacent to the other side of the course 10a. On this gripper the gripper plate 91 is formed of three separate elements 91a, 91b and 91c which are spaced at adjacent ends by distance slightly greater than the width of two bricks. Such spacing is arranged so that the gripper plates 91a and 91c engage and grip the ends of two bricks at each end of the course and the central gripper plate 91b engages and grips the center five bricks of the course. Two bricks between the adjacent ends of the gripper plates 91a, 91b and 91c are not gripped so that when the gripper frame is raised the two brick beyond each end of the center gripping plate 91b are ungripped and remain on the conveyor.

A spring pusher system is provided to insure that such brick are not lifted by the void course gripper 14a. Each of these pushers includes a plate 92 which is spring loaded to a downward position by spring 93 and is sized to engage the top of the ungripped brick. Therefore when the void course gripper 14a is raised these ungripped brick are pushed down and there is no tendency for such brick to be lifted with the gripper. Such brick remain on the conveyor for subsequent removal and reuse as desired.

Figure 8:
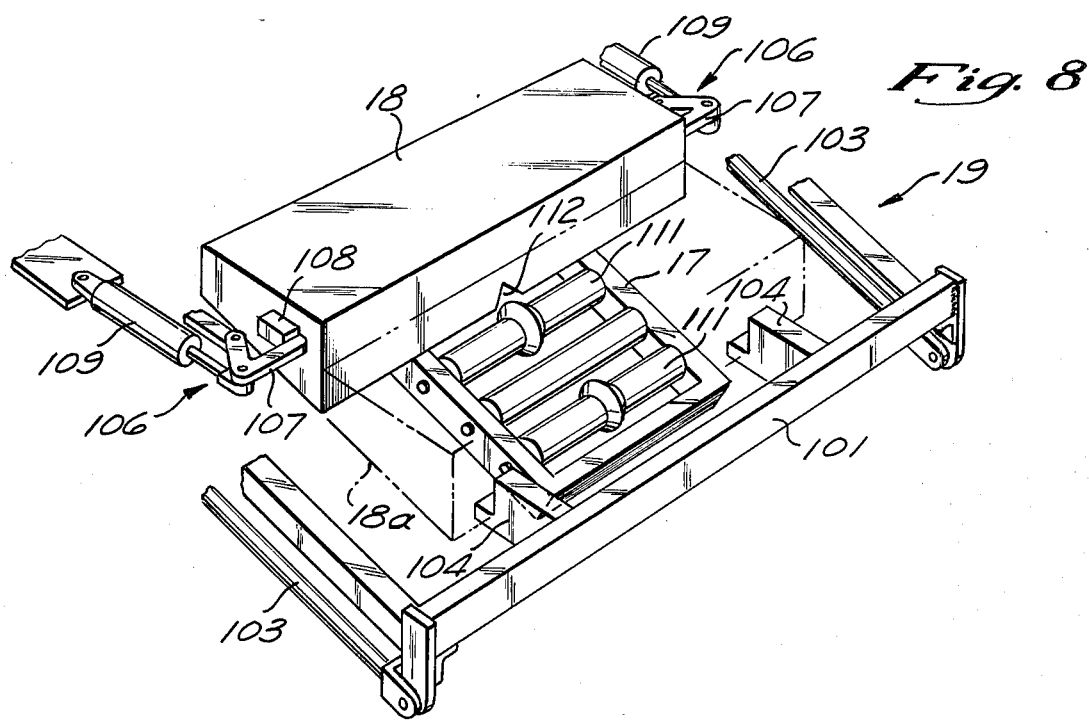
FIG. 8 is an enlarged end view of the mechanism for controlling the movement of the pallets down along the incline conveyor.

The pallet control system 19 is illustrated in FIGS. 1 and 8. This system includes a movable gate 101 powered by a pair of piston and cylinder actuators 102 mounted at opposite ends thereof. The cylinder of each actuator 102 is supported on the main frame of the machine and the pistons 103 are connected to the opposite ends of the movable gate 101. The gate 101 is supported on the frame for movement in the direction of the inclined conveyor 17 and is moved between three positions by the actuators 102. The gate 101 is illustrated in the intermediate position in FIG. 8.

Mounted on the gate 101 are a pair of projections 104 notched at their ends to fit against the end of a pallet 18 and under the forward side of the pallet 18. Gravity causes the pallets to tend to move down the conveyor toward the gate into engagement with the projections 104. The pallet control system also includes a similar but opposite latching mechanism having a lever 107 engageable with a lug 108 on the side of each pallet 18 for holding the lowermost pallet in the position in which a completed stack located thereon is properly positioned for gripping and removal by the shuttle transfer assembly 22. Because the conveyor 17 is inclined, gravity functions to maintain the column of pallets 18 against the lowermost pallet on the conveyor. Therefore, the movement of the entire column of pallets is controlled by the control system 19.

The operation of the pallet control system 19 is as follows. While the column of pallets are held against movement by the engagement of the levers 107 with the lugs 108 the gate 101 is retracted by the pistons 103 until the projections 104 engage the pallet 18 being gripped by the mechanism 106 as illustrated in FIG. 1. The mechanism 106 is provided with a pair of piston and cylinder actuators 109 which then operate to swing the pivoted levers 107 clear of the lugs so that the column is positioned solely by the gate 101.

The pistons 103 are then allowed to extend with controlled relatively slow movement to allow the column of pallets to roll under the influence of gravity down along the conveyor 17 to index such column a distance equal to the spacing between two stacking locations. While such movement is occurring the actuators 109 are extended so that when the next to the bottom pallet on the conveyor 17 reaches the proper position its lugs are engaged by the levers 107 and it is held against further movement down the conveyor 17.

In such position the stack resting on the pallet held by the mechanism 106 is in proper position for gripping by the shuttle transfer carriage 22 and each subsequent pallet up along the conveyor is in a proper stacking location to receive another course of brick. While all of the column of pallets excepting the last or lowermost pallet is held by the mechanism 106 the pistons 103 continue to extend allowing the empty pallet 18a (illustrated in phantom in FIG. 8) to continue down along the conveyor to its end. When such pallet 18a passes beyond the end of the conveyor 17 it drops on to the transfer conveyor 25a and from there rolls on to the powered inclined conveyor 25b which returns such pallet to the other end of the conveyor 17. The pistons 103 then retract so that the projections 104 again engage a pallet 18 held by the mechanism 106. With this simple mechanism the pallets are indexed down along the conveyor 17 in a manner in which each pallet is positioned progressively in each of the stacking locations and ultimately in the transfer location in which the full stack is positioned for removal by the transfer mechanism 22.

As best illustrated in FIG. 8 alternate rollers 111 on the inclined conveyor 17 are provided with a central rib which mates with a groove 112 in the pallets to insure that the pallets are aligned properly as they move down along the conveyor.

Referring to FIG. 1 when the empty pallets reach the upper end of the powered inclined conveyor 25b they roll on to the transfer mechanism 25c which includes a short roller frame 113 which is vertically movable and tipable by a piston and cylinder actuator 114. In the pallet receiving position the roller frame 113 is inclined down away from the upper end of the powered conveyor 25b so that when a pallet reaches the upper end of the power conveyor 25b it rolls on to the frame 113 and against a stop 116. The actuator 114 is then extended to raise the frame 113 up into alignment with the upper end of the conveyor 17 and a lug 117 engages the ends of the side frame of the conveyor 17 so that the frame 113 is tipped over center to allow the pallet carried thereby to roll onto the upper end of the conveyor 17. Here again the powered conveyor 25b is provided with a central rib 118 which fits into the central notch 112 in the lower side of each pallet to maintain the pallets proper alignment.

Figure 9:
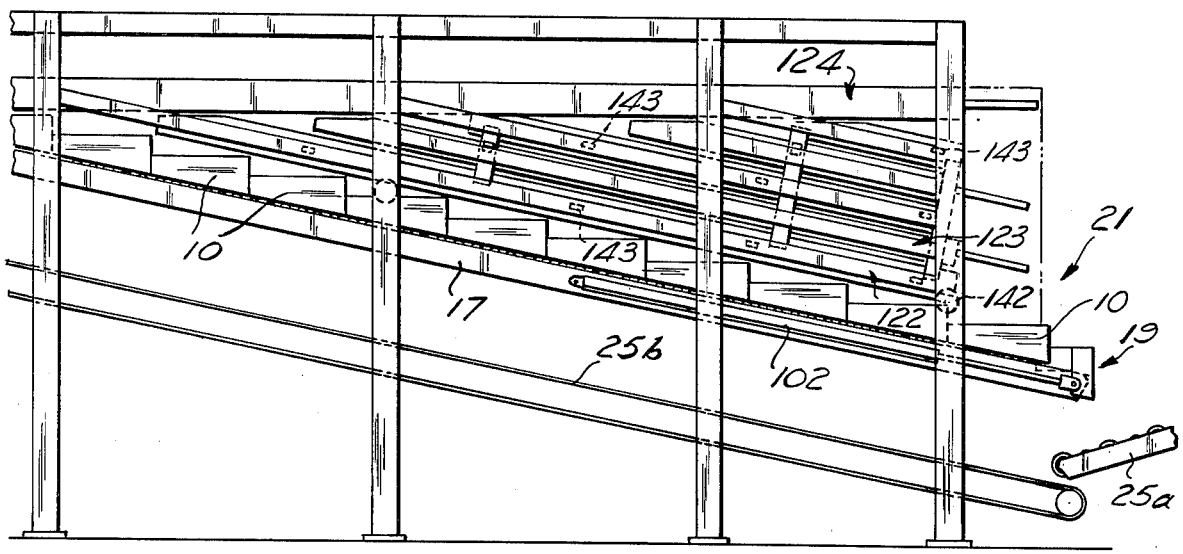
FIG. 9 is a fragmentary side elevation of the descender stacker structure illustrating the clamping mechanism for stabilizing the stacks on the pallets.
Figure 10:
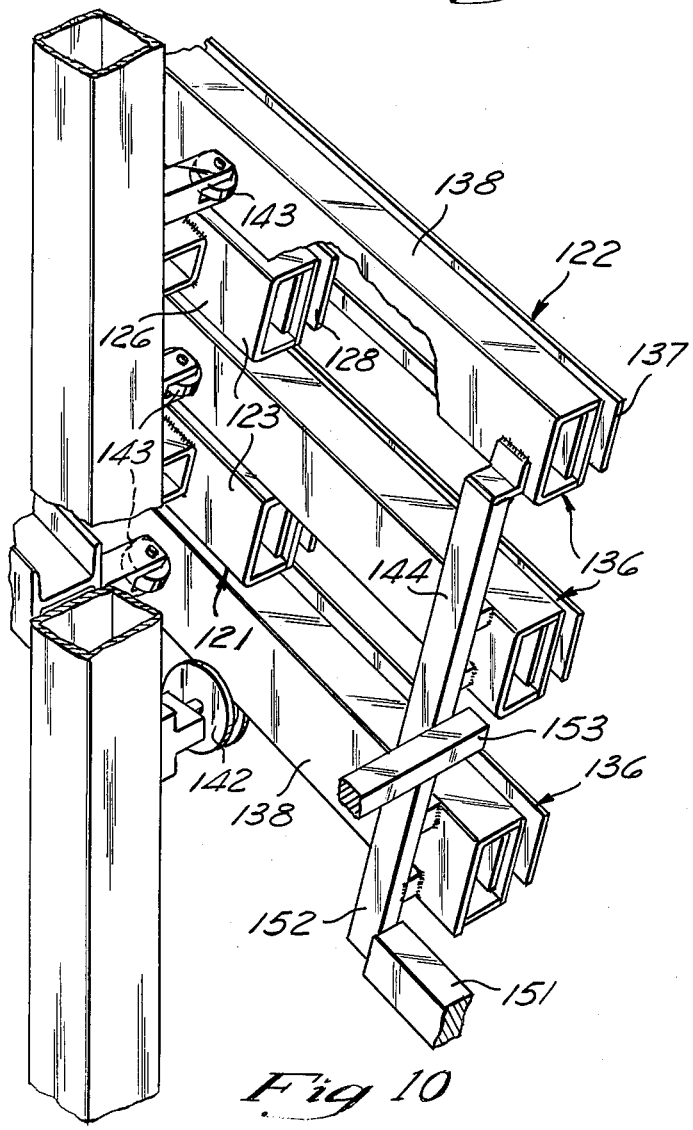
FIG. 10 is an enlarged fragmentary perspective illustrating the lateral clamping structure; and, FIG. 11 is an enlarged end view of the lateral clamping structure for stabilizing and gripping the stacks as they are progressively built.
Figure 11:
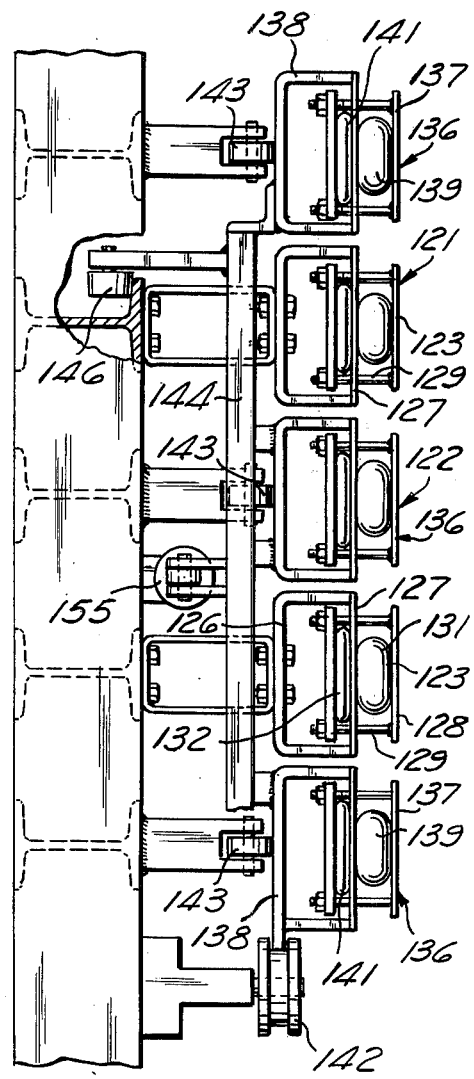

A system for stabilizing the stack as they are formed on the pallet 18 is best illustrated in FIGS. 9 through 11. This system functions to grip the sides of the stacks being formed on the various pallets to prevent the courses from shifting and to prevent the stacks from tipping over while they are formed and transferred from one stacking position to the next. The stack stabilizing system includes two gripper systems 121 and 122. The gripper system 121 is fixed to the frame of the machine and is not movable. It includes two inclined gripper assemblies 123 which extend parallel to the conveyor 17 and an upper gripper assembly 124 of similar structure but which extends horizontally at a location approximately at the top of the stacks being formed on the stacker.

Each of the assemblies 123 and 124 includes a channel 126 having a plate 127 extending across the open end of the channel 126. A gripper plate 128 is supported by bolts 129 for movement toward and away from the plate 127 between a gripping position and a release position. Here, again a pair of inflatable elongated bags or tubes are provided to move the gripper plate 128 between its release position and its gripping position.

When an outer inflatable tube 131 is inflated it reacts between the plate 127 and the gripper plate 128 and causes extension of the gripper plate to the extended gripping position illustrated in FIG. 11. During such operation an inner bag or tube 132 is exhausted to allow such movement. When retraction of the gripper plates 128 is required the inner bag 132 is pressurized while the outer bag 131 is exhausted and this causes movement of the gripper plate to its retracted or release position adjacent to the plate 127. The stationary gripper system 121 is operated to engage the sides of each of the stacks being built on the inclined conveyor while the pallets are held stationary to support and maintain the stacks in the proper position while a course is transferred by the transfer 13 to each of the stacks.

The second gripper system 122 includes three gripper assemblies 136. Here, again each gripper assembly 136 includes a gripper plate 137 carried by a channel member 138 and movable between a gripping position and a retracted position by a pair of opposed inflatable bags or tubes 139 and 141. The channels 138 of this system however are movable relative to the frame of the machine in a direction parallel to the conveyor 17 and are supported vertically by a frame mounted roller 142. Lateral support is provided by face rollers 143 which engage the rearward side of each associated channel 138. The channels 138 are connected together by a bridging member 144 so that they move back and forth as a unit. A roller 146 carried by the bridging member 144 operates to hold the various channels against the rollers 143. The gripping system 122 which is movable back and forth functions to grip the stacks and stabilize the stacks while the pallets are being moved from one stacking location to the next and prevents the stacks from tipping over or being damaged in any way during such movement.

The movement of the gripping system 122 is controlled in part by the actuators 102 which also power the gate 101. The mechanism for accomplishing such movement is illustrated in FIG. 10 and includes an extension 151 carried by the gate which is engageable with an extension 152 on one of the bridging members 144. A fixed stop 153 mounted on the frame of the machine is also engageable with one of the bridging members 144 to limit movement in the direction down along the conveyor 17.

The various elements are proportioned so that the stop 153 operates to prevent further movement of the clamping system 122 when the gate had moved a sufficient distance to allow the second from the last pallet to be engaged by the lever arms 107 to terminate further movement of the column of pallets along the conveyor 17. Continued extension of the gate 101 therefore does not result in continued extension of the gripping system 122. An actuator 155 (illustrated in FIG. 11) is connected between the stationary frame and a bridging member 144 to move the gripping system 122 back up along the conveyor. Preferably a similar pair of stabilizing systems 121 and 122 is provided along opposite sides of the conveyor 17.

When the gate returns toward its retracted position the projections 151 engages the extensions 152 on the gripping systems 122 to control the position of such systems. When the gate extends to the intermediate position the actuator allows the movable gripping system to be lowered with the gate so that the engagement between the extension 152 and the extension 151 causes the gripping systems 122 to move as a unit with the gate 101. The controls for the gripping systems 121 and 122 are arranged so that the movable gripping system 122 is operated to grip the sides of the stack to stabilize the stacks before the stationary gripping system is released. The movable gripping system then maintains the stack stable as they are indexed to the next stacking location. The stationary grouping system 121 is then re-energized to grip before the movable gripping system 122 is released and is subsequently returned to its initial gripping position by the actuator 155. In this manner full stability is provided for stacks during the entire cycle of operation of the machine.

Referring to FIG. 1 the shuttle transfer 22 is provided with lateral side grippers of the same general type in which two opposed elongated pressure bags or tubes function to cause gripping and releasing of the stack. These grippers grip the side of the stack at the last stack location on the conveyor 17. Preferably the gripper transfer is provided with an additional gripper 156 which operates to provide tighter gripping of the bottom two courses of the stack being transported by the transfer 22. The shuttle transfer 22 is powered by an actuator (not illustrated between its phantom position illustrated at 22a in which it grips a completed stack and its full line position in which it delivers a full stack to the roller conveyor 23. The pusher 24 supported by a carriage 159 is movable from the position above the stacks down to a position behind the stacks by an actuator 157 and is moved horizontally by an actuator 158. The pusher operates to move the completed stacks from the shuttle transfer 22 along the conveyor 23 to the strapper.

With the illustrated embodiment of this invention a completed stack is formed during each cycle of the machine so a steady flow of completed stacks is provided to the strapper. Because the void courses are formed at the same location, namely, the third stacking location during each machine cycle, a simple void course forming gripper system can be provided. Further, since large number of bricks are stacked during each machine cycle high outputs are achieved without requiring high cyclic speeds. Still further very complete blending is obtained since each course deposited in a stack, during a given cycle of the machine, appears in a different course level in each stack.

Although a preferred embodiment of this invention is illustrated it is to be understood that various modifications and rearrangements may be resorted to without departing from the scope of the invention disclosed and claimed.

What is claimed is:

1. A brick stacker blender for forming stacks of courses of brick comprising an inclined conveyor providing a plurality of stacking surfaces progressively movable along said conveyor between stacking positions in which each surface is spaced below the preceding surface by a distance substantially equal to the height of a course of brick, and transfer means operable to position a course on each stacking surface at each stacking position.

2. A stacker blender as set forth in claim 1 wherein stabilizing means are provided to stabilize said stacks as they are formed on said inclined conveyor.

3. A stacker blender as set forth in claim 2 wherein said stabilizer means laterally grips said stacks resting on said stacking surfaces.

4. A stacker blender as set forth in claim 3 wherein stabilizing means includes two gripping systems, the first of said gripping systems gripping said stacks as they descend along said inclined conveyor, and the other of said gripping systems gripping said stack while said stacking surfaces are stationary.

5. A stacker blender as set forth in claim 4 wherein said first system is movable back and forth along said inclined conveyor through a distance substantially equal to the distance between said stacking positions.

6. A stacker blender as set forth in claim 5 wherein said first gripping system is connected to move along and with said inclined conveyor when said inclined conveyor operates to move said stacking surfaces between said stacking positions.

7. A stacker blender as set forth in claim 6 wherein said transfer means operates to position a void course on a stack at a predetermined stacking position.

8. A stacker blender as set forth in claim 1 wherein said transfer means operates to position a void course on said stack at a predetermined stacking position.

9. A stacker blender as set forth in claim 1 wherein said transfer means is cyclically operable and provides a plurality of separate course grippers each operable to grip a course at a predetermined pick up location and to position a course on each stacking surface at each stacking position during each cycle of operation.

10. A stacker blender as set forth in claim 9 wherein a delivery conveyor is provided to deliver courses to said pick up location.

11. A stacker blender as set forth in claim 9 wherein said course grippers operate to deliver a void course to a predetermined stacking position during each cycle of said transfer means.

12. A stacker blender as set forth in claim 9 wherein said transfer means operates during each cycle to position each course at a different level in the stacks being formed.

13. A stacker blender as set forth in claim 1 wherein said transfer means operates to position a course on the stack at each stacking position during each cycle of operation with the course positioned at each stacking position being positioned in the stack at a different level than the course being positioned at the other stacking positions.

14. A stacker blender as set forth in claim 13 wherein the uppermost course on each stacking surface is substantially horizontally aligned with the uppermost course on the other stacking surfaces.

15. A stacker for producing stacks of rectangular articles such as brick or the like comprising a plurality of stack support surfaces on each of which a stack is progressively formed, cyclically operable support means for sequentially positioning said support surfaces at horizontally, regularly spaced article receiving stations between which each support surface is lowered a distance substantially equal to the height of a course whereby stacks progressively built on each support surface have a height substantially equal to the height of the stacks being progressively built on the other of said support surfaces, and cyclically operable transfer means operable during each cycle to simultaneously position a course spaced in a regular array of courses corresponding to the spacing of article receiving stations on each support surface at each of said receiving stations whereby a complete stack is formed during each cycle of operation.

16. A stacker as set forth in claim 15 wherein said transfer means positions a void course on a stack at a predetermined article receiving station during each cycle of operation.

17. A stacker as set forth in claim 15 wherein shuttle means are provided to remove completed stacks from said support surfaces.

18. A stacker as set forth in claim 15 wherein said transfer means includes a frame horizontally movable between a pick up position and a delivery position over said support surfaces, and damper means operate to slow said frame as it approaches said delivery position.

19. A stacker as set forth in claim 18 wherein said damper means includes a shock absorber connected to provide increasing resistance to movement as the frame approaches said delivery position.

20. A stacker for producing stacks of rectangular articles such as brick or the like comprising a plurality of stack support surfaces on which a stack is progressively formed, cyclically operable support means for sequentially positioning said support surfaces at horizontally spaced article receiving stations between which each support surface is lowered a distance substantially equal to the height of a course whereby stacks progressively built on each support surface have a height substantially equal to the height of the stacks being progressively built on the other of said support surfaces, and cyclically operable transfer means operable during each cycle to position a course on each support surface at each of said receiving stations whereby a complete stack is formed during each cycle of operation, each stack support surface being provided by a pallet, and said support means operating to return pallets to a first article receiving position for subsequent stacking.

21. A stacker as set forth in claim 20 wherein said support means includes an inclined conveyor along which said pallets are moved by gravity, and control means operate to control the position of the lower pallet and in turn the position of the pallets thereabove along said inclined conveyor.

22. A stacker as set forth in claim 21 wherein said control means includes a gate movable in the direction of said inclined conveyor operable to engage the lower pallet on said conveyor and to control the movement thereof.

23. A stacker as set forth in claim 22 wherein first stabilizing means are provided to grip said stacks on said pallets and to move therewith as said pallets are moved from one article receiving station to the next, said gate controlling the movement of said first stabilizing means.

24. A stacker as set forth in claim 23 wherein second stabilizing means are provided to grip said stacks while said pallets are stationary.

25. A stacker as set forth in claim 15, wherein said transfer comprises a frame linearly movable between first and second positions, a plunger slidably movable on said frame and engageable with fixed stops as said frame approaches said positions to produce relative movement between said frame and plunger, crank means rotated by said relative movement, a shock absorber operatively connected to said crank means so that the amount of shock absorber movement produced by a given amount of said relative movement increases as the frame approaches said positions.

26. A stacker as set forth in claim 25 wherein said shock absorber is a piston and cylinder shock absorber.

27. A method of stacking and blending brick or the like in stacks having a plurality of courses resting one on another comprising forming a plurality of partial stacks with progressively increasing numbers of courses therein, positioning each of said partial stacks with the upper courses thereof in a predetermined position to receive a subsequent course, positioning an additional course on each of said partial stacks, and indexing such stacks to position the upper courses thereon in said predetermined position to receive a subsequent course, said stacks being moved laterally and downwardly along an inclined direction during said indexing so that the stacks occupy the position previously occupied by an adjacent stack.

28. A method of stacking and blending brick or the like as set forth in claim 27 wherein a void course is positioned on one stack at a predetermined level in said one stack during each operation of positioning an additional course on said partial stacks.

29. A method of stacking and blending brick or the like as set forth in claim 27 wherein said positioning of an additional course on each partial stack is performed simultaneously.

30. A method of stacking and blending brick or the like in which said stacks have a plurality of courses resting one on another comprising forming a line of partial stacks with a number of courses within said stacks increasing from one end of said line toward the other end thereof, positioning said stacks so that the upper courses are substantially at a predetermined level; and with repeated cycles positioning an additional course on each stack, and thereafter indexing said stacks toward said other end and lowering them along an inclined direction so that the upper courses are again at such predetermined level.

31. A method of stacking and blending brick or the like as set forth in claim 30 wherein said stacks are stabilized during said indexing.

32. A method of stacking and blending brick or the like in which said stacks have a plurality of courses resting one on another comprising forming a line of partial stacks with a number of courses within said stacks increasing from one end of said line toward the other end thereof, positioning said stacks so that the upper courses are substantially at a predetermined level; and with repeated cycles positioning an additional course on each stack, and thereafter indexing said stacks toward said other end and lowering them so that the upper courses are again at such predetermined level, said brick being supplied in courses arranged in a predetermined order, and said additional courses are positioned on said stacks in said predetermined order but are positioned at different levels in said stacks.

33. A method of stacking and blending bricks or the like in stacks having a plurality of courses resting one on another comprising positioning a plurality of partial stacks supported for inclined movement in a predetermined direction, said stack being arranged with increasing numbers of courses in said direction and with their upper courses substantially at a predetermined level; and with repeated cycles positioning a course on each stack and moving said stacks in said direction to reposition the upper course thereon at said predetermined level.

34. A method of stacking and blending brick or the like as set forth in claim 33 wherein said course is simultaneously positioned on each stack during each cycle, and a stack is completed during each cycle.

35. A method of stacking and blending bricks or the like as set forth in claim 33 wherein a void course is positioned on a stack at a predetermined location during each cycle.

36. A method of stacking and blending brick or the like in stacks having a plurality of courses resting one on another comprising forming a plurality of partial stacks with different numbers of courses therein, positioning each of said partial stacks with the upper courses thereof in a predetermined position to receive a subsequent course, positioning an additional course on each of said partial stacks, and indexing such stacks to position the upper course thereon in said predetermined position to receive a subsequent course, said brick being supplied in courses arranged in predetermined order, said additional courses being positioned on said stacks in said predetermined order but being positioned at different levels in said stacks.

* * * * *